United States Patent [19]

Osborne

[11] Patent Number: 5,036,340

[45] **Date of Patent: * Jul. 30, 1991**

[54] PIEZOELECTRIC DETECTOR FOR DROP POSITION DETERMINATION IN MULTI-PEN INK JET PRINTING SYSTEMS

[75] Inventor: William S. Osborne, Escondido, Calif.

[73] Assignee: Hewlett-Packard Company, Palo Alto, Calif.

[ * ] Notice: The portion of the term of this patent subsequent to May 1, 2007 has been disclaimed.

[21] Appl. No.: 490,021

[22] Filed: Mar. 7, 1990

Related U.S. Application Data

[63] Continuation-in-part of Ser. No. 304,544, Jan. 31, 1989, Pat. No. 4,922,268.

[51] Int. Cl.⁵ ........................ B41J 3/04; G01D 18/00

[52] U.S. Cl. ................................................ 346/140 R

[58] Field of Search .................................. 346/140, 75

[56] References Cited

U.S. PATENT DOCUMENTS 4,835,435 5/1989 Yeung et al. .......................... 346/75

4,922,268 5/1990 Osborne .......................... 346/140 R

*Primary Examiner*—Benjamin R. Fuller

*Assistant Examiner*—Alrick Bobb

[57] ABSTRACT

Apparatus for determining inter-pen offsets in a multiple pen ink jet printer including a piezoelectric ink drop detector having a piezoelectric detector film having one or more openings formed therein. A carriage position sensor indicates the position of the carriage at the time a first ink drop is detected from each of the ink jet pens as the pens are scanned across an opening, whereby the sensed positions for the respective pens provides information indicative of inter-pen offset in the scan direction. For determination of inter-pen offset in the media scan direction, the piezoelectric film includes a plurality of openings, whereby the detect/no detect patterns for each of the pens provides information indicative of the inter-pen offsets.

10 Claims, 2 Drawing Sheets

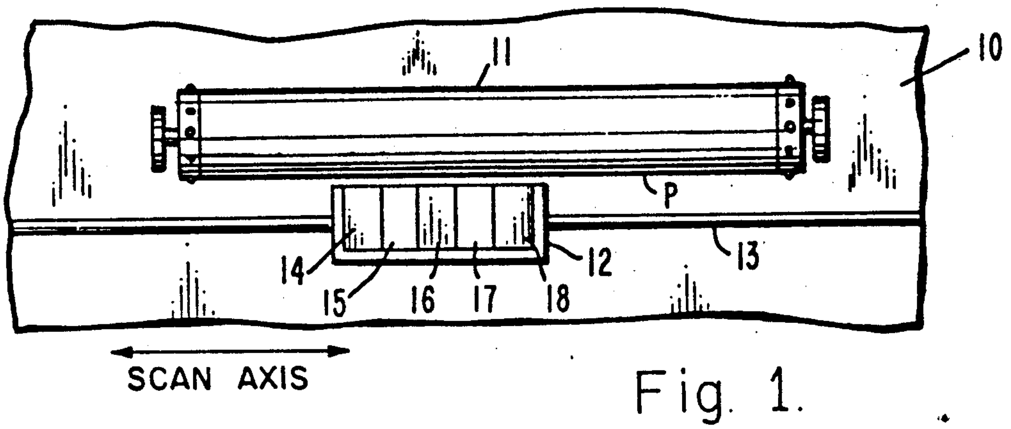
Fig. 1.
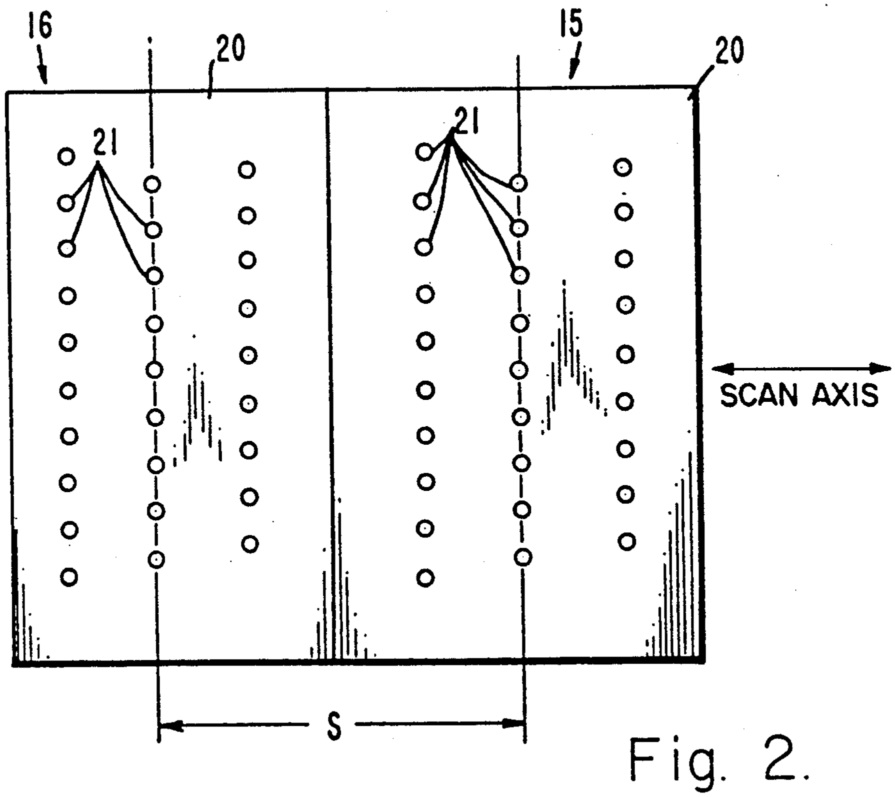
Fig. 2.
Fig. 3.
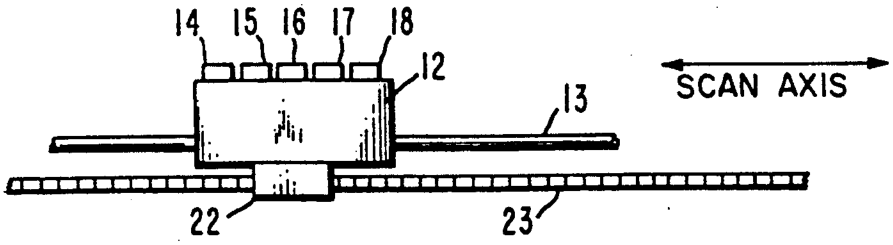

PIEZOELECTRIC DETECTOR FOR DROP POSITION DETERMINATION IN MULTI-PEN INK JET PRINTING SYSTEMS

This is a continuation-in-part of U.S. Patent application Ser. No. 07/304,544, filed Jan. 31, 1989 now U.S. Pat. No. 4,922,268, issued May 1, 1990.

BACKGROUND OF THE INVENTION

The present invention relates to ink jet printing apparatus employing a plurality of printing modules. More particularly, the invention relates to calibrating the distance between pens in the pen scan direction (Y), and calibrating the displacement of nozzle arrays relative to each other in the print media index axis (X).

The design of color ink jet printers is described in the August 1988 issue of the Hewlett-Packard Journal.

The following U.S. patents disclose ink jet printing technology: U.S. Pat. No. 4,709,245, M. J. Piatt, "Ink Jet Printer for Cooperatively Printing with a Plurality of Insertable Print/Cartridges"; U.S. Pat. No. 4,709,246, M. J. Piatt et al., "Adjustable Print/Cartridge Ink Jet Printer," U.S. Pat. No. 4,709,247, M. J. Piatt et al., "High Resolution, Print/Cartridge Ink Jet Printer"; U.S. Pat. No. 4,709,248, M. J. Piatt et al., "Traverse Printing Control System for Multiple Print/Cartridge Printer"; all issued Nov. 24, 1987.

SUMMARY OF THE INVENTION

Commonly assigned U.S. Patent application Ser. No. 07/304,980, filed Jan. 31, 1989, now U.S. Pat. No. 4,922,270, issued May 1, 1990 entitled, "Inter Pen Offset Determination and Compensation in Multi-Pen Thermal Ink Jet Pen Printing Systems," by Cobbs et al., and a continuation-in-part thereof, U.S. patent application Ser. No. 07/490,022, filed Mar. 7, 1990, describe a highly useful invention for calibrating the distance between pens in the pen scan direction (Y), and calibrating the displacement of nozzle arrays relative to each other in the print media index axis (X).

In general, that invention employs an optical drop detector and a separate aperture plate with an opening having teeth disposed in a vernier comb-like pattern. The present invention provides inter-pen offset determination and compensation by means of a novel arrangement employing a piezoelectric drop detector provided with a punched hole pattern therein. The arrangement of the present invention has the advantages of simplicity and low cost when used in place of the optical drop detector and separate aperture plate.

In accordance with the present invention, there is provided a color alignment system for multiple pen ink jet printing systems having a capability to measure tolerance-related dot placement errors. This capability allows application of a correction algorithm to the drop fire timing and image data such that the highest possible quality image is produced. In the pen scan axis the pen carriage is driven at a constant velocity by means of servo control while one of the pens is firing at a constant frequency. The ink drops initially pass through an opening provided in a piezoelectric film and are not detected. When the drop stream hits the piezoelectric film at the edge of the opening, the impact causes a piezoelectric charge to be developed. At the instant of drop detect, the carriage position is read. Comparison of the position of the carriage for all pens at the instant of first drop detect provides the inter pen spacings, or distances between the pens in the pen scan direction (Y). Multiple tests per pen may be taken in one carriage pass.

The displacement of nozzle arrays in the index axis direction (X) is measured by successively positioning each pen over a special pattern of openings provided in the piezoelectric film, and firing the nozzles individually to produce a detect/no detect pattern for the nozzles of each of the pens. The patterns for each of the pens are then compared to determine relative offsets between the pens in the media index direction.

The algorithm for the calibration of the distance between pens in the pen scan direction, and the calibration of the displacement of the nozzle arrays in the print media index direction is employed as a correction algorithm to electronically compensate the drop fire timing and the image data. This enables the multi-pen thermal ink jet printer of the present invention to accurately overlay the primary color dots, thus resulting in a high quality image being produced.

If desired, a combined wick and wiper may be provided to remove ink from the piezoelectric film by means of non-contact wicking/wiping action that conducts the ink to an absorbent collector.

BRIEF DESCRIPTION OF THE DRAWINGS

The foregoing and other features of the present invention can be more readily understood with reference to the following detailed description, taken in conjunction with the accompanying drawings, wherein like reference numerals designate like structural elements, and in which:

FIG. 1 is a plan view of a portion of a thermal ink jet printer constructed in accordance with the present invention, shown broken away to illustrate the interior thereof.

FIG. 2 is an elevation view of adjacent orifice plates greatly magnified illustrating the inter-pen spacing between nozzle arrays.

FIG. 3 is an elevation view of the pen carriage showing the integral linear position encoder and its associated code strip.

DETAILED DESCRIPTION OF THE DISCLOSURE

Figure 4:
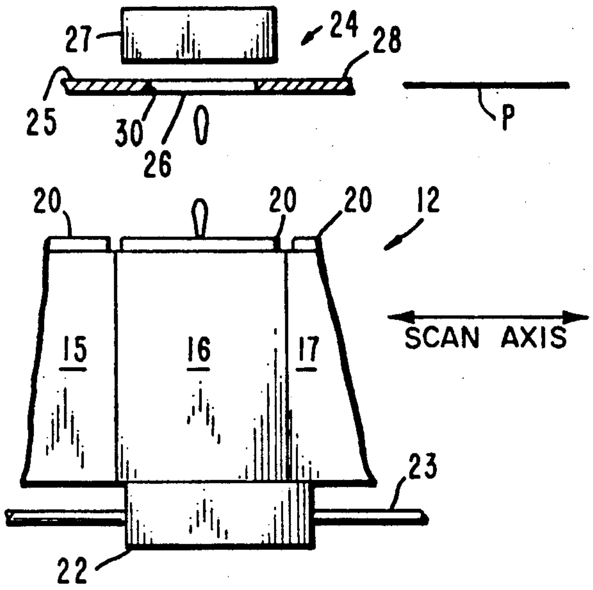
FIG. 4 is a plan view showing a pen firing ink drops toward a piezoelectric drop detector having an opening therein.

Referring now to FIG. 1, there is shown a plan view of an ink jet printer 10. The printer 10 is shown broken away, and in the interior thereof there may be seen a roll or platen 11 for carrying and indexing the print media, which may be paper, overhead transparency film, or the like. A carriage 12 is mounted for movement back and forth adjacent the print zone P. of the platen 11 along a guide rail 13. Mounted within the carriage 12 are a plurality of disposable print cartridges or pens 14, 15, 16, 17 and 18. There is no fixed order for the pens 14–18, but for purposes of description, it will be assumed that by way of example, pen 14 prints the color cyan, pen 15 magneta, pen 16 yellow, and pens 17 and 18 print black, although only one black pen 17 may be used, if desired. By way of illustrative example, the pens 14–18 are thermal ink jet pens employing heating of a thin-film resistor to fire a drop of ink on demand. It should be appreciated that any type of ink jet technology can be utilized to implement the invention.

Each pen 14–18 has a plurality of nozzles 21 (FIG. 1), and each nozzle 21 can supply a drop of ink on demand as the pen carriage 12 scans across the print media carried by the platen 11.

FIG. 2 shows an elevation view of adjacent orifice plates 20, greatly magnified, which form a part of the pens 14–18. The orifice plates 20 are shown with thirty nozzles 21 for convenience of description, although the actual number of nozzles 21 may be more or less than 30, if desired. Furthermore, the orifice plates 20 may have a different configuration than that shown, for example, long and narrow with the nozzles 21 in two rows instead of three.

It has been found that there exists a strong correlation between the alignment of the primary color dots and the quality of the resulting image. In the multi-pen printer of the present invention, the ability to accurately overlay the primary color dots is dependent on manufacturing tolerances in both the pens and the printer. Rather than reduce these tolerances by refining the manufacturing processes, the printer of the present invention is provided with the capability to measure tolerance-related dot placement errors. This capability allows application of a correction algorithm to the dropfire timing and image data such that the highest possible quality image is produced.

To calibrate the pens 14–18, there is provided a linear encoder 22, shown in FIGS. 3 and 4. The linear encoder 22 is a high resolution carriage position sensor with quadrature outputs, the resolution being increased by interpolating between quadrature states. The linear encoder 22 is integral to the pen carriage 12 and provides a constant output of position of the carriage 12 as the pens 14–18 are scanned back and forth along the guide rail 13.

Referring to FIG. 3, the linear encoder 22 which is integral to the carriage 12 employs as a reference a code strip 23. The code strip 23 is a long strip of DuPont Mylar brand material, for example, provided with a marking of opaque lines, which may be photographically produced. Typically, the code strip 23 may have on the order of 150 lines per inch. The linear encoder 22 may be a linear optical incremental encoder module, such as model HEDS-9200 manufactured by the Optoelectronics Division of Hewlett-Packard Company. A quadrature output of typically 600 to 800 counts per inch is used to operate the motion control system. The reference signal for positioning of ink drops on the print media is generated from a single channel of the encoder 22. This eliminates any possible problem with phase errors in the encoder 22.

In prior art devices the position of the orifice plate is detected to determine distance between pens in the pen scan direction (Y). In the present invention the position of a drop of ink in the nominal plane of the print media is detected.

In FIG. 4 there is shown a plan view of the arrangement for determining distance between pens in the pen scan direction (Y). To one side of the print zone (P), a drop detector 24 is placed in the nominal plane of the print media. The drop detector 24 comprises a strip of piezoelectric film 25 which is freely suspended or mounted as a diaphragm to the base of the printer 10. The film 25 is located to be coplanar with the print zone P. The piezoelectric film 25 may be film sold under the trade name KYNAR, or the like. The piezoelectric film 25 is provided with an opening 26. Behind the opening 26 there is disposed an absorbent ink collector 27. An electrical connection 28 conducts any electric charge developed by the piezoelectric film 25 to an amplifier and microprocessor electronics (not shown).

In accordance with the invention, the carriage 12 is scanned at a constant velocity from right to left so that each of the pens 14–18 will pass over the left edge of the opening in the piezoelectric film 25, and each pen is controlled to fire continuously as one of its nozzles traverses the edge of the opening. In particular, as the first pen approaches the left edge of the aperture, the nozzle at a selected position is fired continuously at the rate of 2000 or more drops per second, with the firing of ink drops beginning at a position such that the drops initially pass through the opening 26 and are collected in the absorbent ink collector 27. When the drop stream hits the edge 30 of the opening 26, it impacts a portion of the piezoelectric film 25, causing an electric charge to be developed. At the instant of first drop detect, the encoder 22 integral with the carriage 12 is read, and the nozzle is turned off. As each successive pen approaches the left edge of the opening, its nozzle at the selected nozzle position is fired, and the process repeated. In other words, one nozzle from each pen is fired in any given pass, and all such nozzles are in the same array position in each pen.

It should be appreciated that timing of the firing of the selected nozzles of the pens after the first pen can be based on the stored encoder position information obtained pursuant to the foregoing procedure for the pen prior in sequence, since the nominal pen spacing is known and the start of firing can be based on the worst case tolerance expected. The firing of the first pen would be controlled to start at about 1 mm, for example, before the aperture edge is traversed.

Since the carriage 12 travels at a constant velocity and the pens 14–18 are fired, in turn, at a constant frequency, the distance between the pens 14–18 in the pen scan direction (Y) is easily determined. Comparison of the carriage positions for all pens 14–18 provides the inter-pen spacings.

Figure 6:
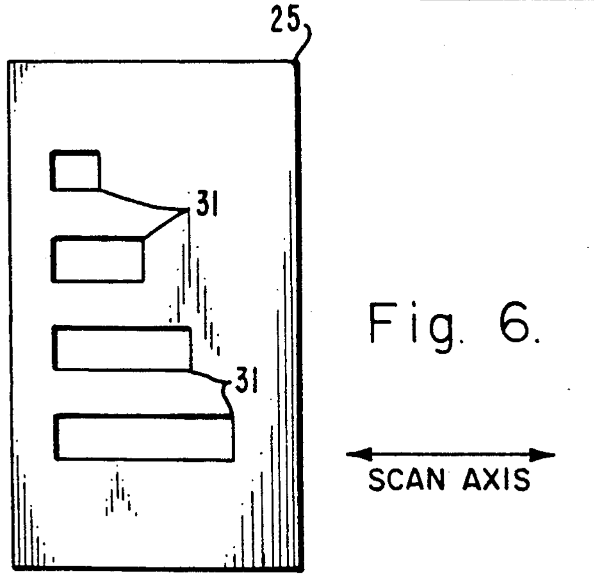
FIG. 6 is an elevation view greatly magnified of a piezoelectric film having a special pattern of openings therein for calibration pen offsets.

FIG. 6 illustrates an aperture plate 25 having an aperture pattern 31 therein that permits the simultaneous calibration of a plurality of nozzles that are separated by several nozzles. The aperture pattern 31 comprises rectangular openings of varying lengths arranged side-by-side in a stair-step pattern, one opening being provided for each of the nozzles to be calibrated. The openings are located and dimensioned such that the ink drops from the nozzle with which it is associated will always fully impact only a vertical edge of the opening in the expected worst case trajectory.

In accordance with the invention, the carriage 12 is scanned at a constant velocity from left to right so that the nozzles to be used for calibration will pass over the right side vertical edges of the associated openings in the aperture pattern 31 while firing continuously. As to each pen, the firing of a nozzle to be used for calibration is started at a position such that drops initially pass through the opening. When the drops are detected by the piezoelectric film, the encoder is read and the nozzle is turned off. With the pattern of FIG. 6, the uppermost nozzle for calibration would be fired first, followed by the next lower nozzle for calibration, and so forth. The horizontal spacing between adjacent right side vertical edges is selected to prevent ambiguity in associating detected drops with a particular nozzle. Also, the total horizontal distance between the leftmost right side vertical edge of the pattern (i.e., the right edge of the top opening) and the rightmost right vertical edge of the pattern (i.e., the right edge of the bottom opening) is sufficiently less than the smallest inter-pen distance expected, so as to permit calibration of all pens in one scan.

The pen spacings indicated by the respective nozzle positions can be utilized to provided average inter-pen spacings.

The resolution of the linear encoder 22 is increased by interpolating between pulses. The measurement of the inter-pen distance or spacing (S) involves two problems. The carriage 12 is moved at a constant velocity controlled by a servo via the linear encoder 22 and the code strip 23. The first problem in the measurement of inter-pen spacing (S) is that the very slow speed at which the drop detection must be performed (typically on the order of 0.625 to 0.833 inches per second) necessitates a special servo system configuration. The resolution of the linear encoder 22 is such that one encoder count will be traversed in two milliseconds. The high quality velocity feedback needed for stabilizing the servo loop can be obtained despite the quantization of the encoder feedback by timing between encoder counts.

The second problem is that the resolution of the measurement that is needed is greater than the 0.00125 inch quantization level of the linear encoder 22. This problem is solved by interpolating between encoder counts by means of time measurements. The time elapsed between encoder counts is available from the timing based servo previously described. An additional timer provides the time elapsed from the last encoder count until drop detection is indicated by the drop detector 24. The ratio of these times can be used to interpolate the position of the carriage 12 at the time of the drop detection. Comparison of the carriage 12 for all pens 14–18 provides the inter-pen spacing (S). Actual test results have shown that position measurements of 0.0004 inch or better are obtained.

This measurement of the inter-pen spacings S is performed automatically to one side of the prints zone P, and the result of the measurement is converted to a correction algorithm to electronically compensate the drop fire timing and image data. This enables the multi-pen ink jet printer 10 of the present invention to accurately overlay the primary color dots, thus resulting in a high quality image being produced.

Figure 5:
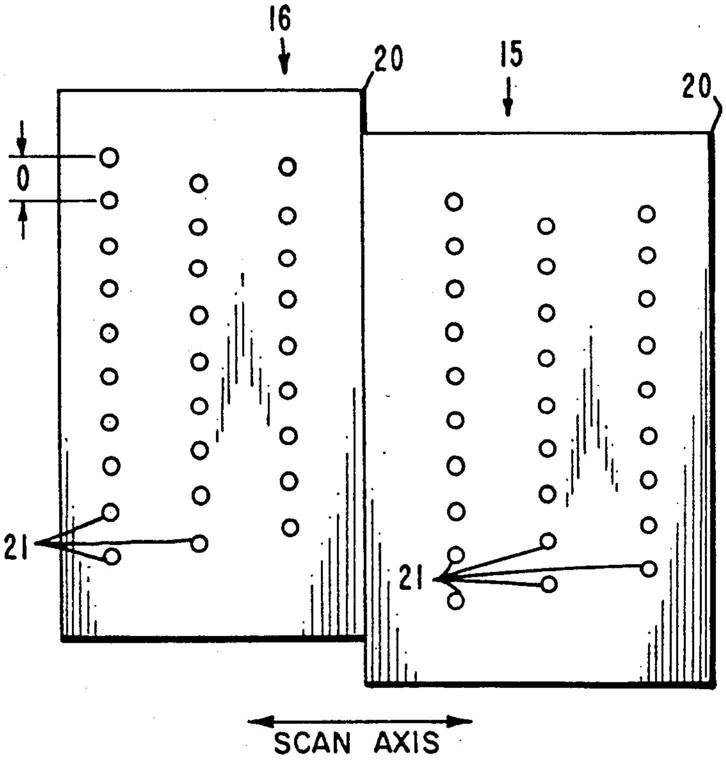
FIG. 5 is an elevation view of adjacent orifice plates greatly magnified illustrating the offset between nozzle arrays.

As is well known, the cartridges or pens 14–18 are replaceable and are held in place by a latch mechanism and by mechanical registration surfaces. The repeatability of registration of the pens 14–18 to the carriage 12 directly affects the print quality. The body of the print cartridges or pens 14–18 has some uncertainty in dimension. Discrepancies in alignment of the pens 14–18 may result in offsets (O) or displacements of nozzle arrays relative to each other in the print media index axis (X) as shown in FIG. 5.

X-axis measurements are made by successively positioning each one of the pens 14–18 over a vernier pattern similar to the aperture pattern 31 of openings provided in the piezoelectric film 25 as shown in FIG. 6.

The pens 14–18 are individually positioned over the piezoelectric film having the vernier pattern, and each nozzle is fired individually and in succession. Drops from some of the nozzles impact the piezoelectric film 25 and are detected, while drops from other nozzles pass through the vernier pattern of openings and are not detected. This information is mapped into the known position of each nozzle 21 to create a detect/no detect pattern for each of the pens 14–18. The patterns are then compared to determine relative offsets from pen-to-pen. If two of the pens 14–18 are determined to be out of alignment by more than one-half a dot row, the image data is shifted up or down in the nozzle arrays to produce the optimum alignment. Note that by doing so, nozzles 21 at the ends of the arrays may have to be sacrificed. That is, they will not be usable.

The algorithm is a detect/no detect pattern generated from each of the pens 14–18 to determine relative pen-to-pen offsets O. This algorithm for the pen alignment in the print media index axis (X) is employed as a measurement algorithm to be able to electronically compensate the image data. This enables the multi-pen thermal ink jet printer 10 of the present invention to accurately overlay the primary color dots, thus resulting in a high quality image being produced.

By way of illustrative example, the detect/no detect data can be utilized as follows. Each of the vernier pattern horizontal edges is identified by number E=1, N, for N edges, for example, starting at the top edge. As to each pen, the nozzles are identified by a number P=1, M, for M nozzles, for example, starting at the top nozzle. Pursuant to the detect/no detect data for a pen, for each edge a a nozzle is identified as being closest to such edge. To determine offset between two pens in the media scan direction (X), the difference between respective nozzle position numbers is calculated for each edge. The differences are then added together, and the sum is divided by the number of edges N. Such offset is expressed in terms of nozzle rows, and the equation for the calculation is as follows:

$$\text{delta } X = \left[ \sum_{i=1}^{N} (B(i) - (A(i)) \right] / N$$

wherein:

N=the number of vernier edges.

delta X=offset between pens A an dB in the X axis.

A(i)=the nozzle number of the nozzle of the pen A that is closest to the ith vernier edge.

B(i)=the nozzle number of the nozzle of the pen B that is closest to the ith vernier edge.

For nozzles that are substantially aligned, the above equation provides a delta X of zero.

The vernier is designed such that the horizontal edges are at spacings which are not integer multiples of the resolution of the printhead, which allows for greater resolution in locating each pen.

It should be appreciated that the aperture pattern of FIG. 6 can be utilized for scan axis offset measurements utilizing multiple nozzles per pen, as well as for print media index axis offset measurements. Also, such pattern can be utilized for scan axis offset measurements utilizing one nozzle per pen, although certain nozzle positions might not be available for such measurements due to the locations of the openings.

Thus, there has been described inter-pen offset determination and compensation in multi-pen thermal ink jet pen printing systems. It will be seen that the printer of the present invention measures drop location data in the nominal plane of the print media rather than at the orifice plate. It will be seen that the printer of the present invention detects drop position both in X and Y axes, not in just one axis. Also, it will be seen that the printer of the present invention compensates for directionality errors because it measures drop position in the nominal plane of the print media.

While the invention has been disclosed in the context of a thermal drop on demand ink jet printer, the invention can be employed with ink jet technologies in general, including other drop on demand ink jet systems and continuous ink jet systems.

It is to be understood that the above-described embodiment of the invention is merely illustrative of the many possible specific embodiments which represent applications of the principles of the present invention. Numerous and varied other arrangements can be readily devised in accordance with these principles by those skilled in the art without departing from the scope of the invention.

What is claimed is:

1. Apparatus for providing inter-pen offset determination in an ink jet printer having multiple ink jet pens, comprising:

(a) carriage means for scanning along a print zone in a scan direction;

(b) a plurality of color pens carried by said carriage means and being adapted to fire drops of ink on demand;

(c) position sensing means for indicating a position of said carriage means as it carriage means scans in the scan direction;

(d) piezoelectric detector means having a piezoelectric film for detecting the impact of a drop of ink and being disposed in a coplanar relationship with said print zone;

(e) an opening in said piezoelectric detector means such that ink drops pass therethrough and are not detected until said carriage means scans beyond said opening;

(f) the detect/no detect measurement of drops impacting and not impacting said piezoelectric drop detector means, as the carriage means scans, providing measurement of spacing between pens in the pen scan direction.

2. Apparatus for providing inter-pen offset determination in an ink jet printer having multiple ink jet pens, comprising:

piezoelectric detector means having a piezoelectric film for detecting the impact of a drop of ink and being disposed in a coplanar relationship with said print zone;

a pattern of openings provided in said piezoelectric film;

the mapped position of nozzles with respect to the pattern of openings in said piezoelectric detector means providing a measurement of offset between the ink jet pens.

3. Apparatus for providing inter-pen offset determination in an ink jet printer having multiple ink jet pens supported in a movable carriage, comprising:

piezoelectric detector means having a piezoelectric film for detecting the impact of a drop of ink and being disposed in a coplanar relationship with a print zone;

an aperture formed in said piezoelectric film;

carriage position sensing means for indicating the position of said carriage at the time a first ink drop is detected from each of the ink jet pens as the pens are scanned across said opening, whereby the carriage positions for the respective pens provide information indicative of the inter-pen offsets between pens in the scan direction.

4. Apparatus for providing inter-pen offset determination in an ink jet printer having multiple ink jet pens, comprising:

piezoelectric detector means having a piezoelectric film for detecting the impact of a drop of ink and being disposed in a coplanar relationship with a print zone; and a precision hole pattern formed in said piezoelectric film, whereby the respective detect/no detect patterns for each of the pens provides information indicative of the inter-pen offsets between respective pens.

5. A calibration system for providing inter-pen offset determination in a multi-pen ink jet printer, each pen having a nozzle array, the calibration system comprising:

piezoelectric detector means having a piezoelectric film for detecting the impact of ink from the pens;

an aperture pattern formed in said piezoelectric film for providing a plurality of precision location references along the carriage scan direction for use with nozzles located at selected nozzle positions;

means for scanning the carriage so that the pens scan across said aperture pattern; and carriage position sensing means for indicating the position of the carriage when ink drops from an ink firing nozzle is first detected, which indicates that the ink output of the ink firing nozzle has traversed one of said precision location references, whereby the sensed carriage positions for respective pens provide information indicative of inter-pen offset.

6. The calibration system of claim 5 wherein said carriage means is controlled to move the pens such that the firing of a nozzle being used for calibration causes a detect to a no detect transition as the ink output of such nozzle traverses a precision location reference.

7. The calibration system of claim 5 wherein said aperture pattern includes a plurality of openings having edges orthogonal to the carriage scan direction and offset relative to each other in the carriage scan direction and in the media scan direction.

8. The calibration system of claim 7 wherein the openings of said aperture pattern comprise rectangular openings of varying lengths in the scan direction and arranged side-by-side in a stair-step pattern.

9. Apparatus for providing inter-pen offset determination in an ink jet printer having multiple ink jet pens having respective nozzle arrays, comprising:

piezoelectric detector means having a piezoelectric film for detecting the impact of a drop of ink and being disposed in a coplanar relationship with a print zone;

a plurality of apertures formed in said piezoelectric film through which ink drops can pass and be detected by said drop detector, whereby a detect/no detect pattern for each pen is produced by positioning each pen over the aperture pattern and individually firing the nozzles of the positioned pen.

10. The apparatus of claim 9 wherein said apertures comprise a vernier pattern of openings.

* * * * *